US010229420B2

(12) United States Patent
Hamilton, II et al.

(10) Patent No.: US 10,229,420 B2
(45) Date of Patent: Mar. 12, 2019

(54) PRODUCT CUSTOMER SUPPORT IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2375 days.

(21) Appl. No.: 12/133,466

(22) Filed: Jun. 5, 2008

(65) Prior Publication Data

US 2009/0307023 A1 Dec. 10, 2009

(51) Int. Cl.
*G06Q 30/02* (2012.01)
*G06Q 30/00* (2012.01)

(52) U.S. Cl.
CPC .......... *G06Q 30/02* (2013.01); *G06Q 30/012* (2013.01); *G06Q 30/016* (2013.01)

(58) Field of Classification Search
CPC .................................................. G06Q 30/02
USPC .............................. 705/10; 704/270; 715/757
See application file for complete search history.

(56) References Cited

U.S. PATENT DOCUMENTS 5,592,543 A * 1/1997 Smith et al. ............. 379/266.07
7,319,992 B2 * 1/2008 Gaos ............................. 706/62

2005/0125229 A1 * 6/2005 Kurzweil ..................... 704/270
2005/0251553 A1 * 11/2005 Gottfried ..................... 709/204
2006/0182261 A1 * 8/2006 Grass et al. ............. 379/265.12
2008/0263460 A1 * 10/2008 Altberg et al. ............... 715/757

FOREIGN PATENT DOCUMENTS

JP  2009140492 A  *  6/2009  ............. G06F 3/011

OTHER PUBLICATIONS http://www.silicon.com/technology/networks/2007/04/10/could-second-life-kill-off-the-call-centre-39166673. Best, Jo. Could Second Life Kill off the Call Centre? Apr. 10, 2007.*
http://www.silincon.com/technology/networks/2007/01/IO/could-second-life-kill-off-the-call-centre-39166673.*

* cited by examiner

*Primary Examiner* — Richard N Scheunemann
(74) *Attorney, Agent, or Firm* — Brian Restuaro; Hoffman Warnick LLC

(57) ABSTRACT

The present invention relates to virtual universe product customer support. A method for providing customer service in a virtual universe in accordance with an embodiment of the present invention includes: determining that a real-world product may have a problem; collecting information associated with the product; analyzing the collected information at a support location service in the virtual universe to determine a land location within the virtual universe of a product support center for the product; and providing an avatar with a teleportation invitation to the product support center.

16 Claims, 4 Drawing Sheets

PRODUCT CUSTOMER SUPPORT IN A VIRTUAL UNIVERSE

FIELD OF THE INVENTION

The present invention relates to a virtual universe, and more specifically relates to virtual universe customer support.

BACKGROUND OF THE INVENTION

A virtual universe is an interactive simulated environment accessed by multiple users through an online interface. Users inhabit and interact in the virtual universe via avatars, which are two or three-dimensional graphical representations of humanoids. There are many different types of virtual universes, however there are several features many virtual universes generally have in common:
A) Shared Space: the virtual universe allows many users to participate at once.
B) Graphical User Interface: the virtual universe depicts space visually, ranging in style from 2D "cartoon" imagery to more immersive 3D environments.
C) Immediacy: interaction takes place in real time.
D) Interactivity: the virtual universe allows users to alter, develop, build, or submit customized content.
E) Persistence: the virtual universe's existence continues regardless of whether individual users are logged in.
F) Socialization/Community: the virtual universe allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual universes, such as that provided in the on-line world Second Life (Second Life is a trademark of Linden Research in the United States, other countries, or both). The Second Life client program provides its users (referred to as residents) with tools to view, navigate, and modify the Second Life world and participate in it's virtual economy.

Second Life and other on-line virtual universes present a tremendous new outlet for both structured and unstructured virtual collaboration, gaming and exploration, as well as real-life simulations in virtual spaces. These activities, along with yet to be disclosed new dimensions, in turn provide a wide open arena for creative and new business interactions, methods and mechanisms.

SUMMARY OF THE INVENTION

The present invention is directed to virtual universe customer support. More specifically, the present invention provides a methodology for obtaining customer support for "real-world" products via a virtual universe to provide efficient customer support, and to assist in problem identification and resolution. The virtual universe assists consumers by proposing and rendering solutions to common problems based on information provided by the consumer. Additionally, the present invention allows support specialists to interact with customers and to show the customer how to resolve a support issue.

A first aspect of the present invention is directed to a method for providing customer service in a virtual universe, comprising: determining that a real-world product may have a problem; collecting information associated with the product; analyzing the collected information at a support location service in the virtual universe to determine a land location within the virtual universe of a product support center for the product; and providing an avatar with a teleportation invitation to the product support center.

A second aspect of the present invention is directed to a system for providing customer service in a virtual universe, comprising: at least one computer, including: a system for determining that a real-world product has a problem; a system for collecting information associated with the product; a system for analyzing the collected information at a support location service in the virtual universe to determine a land location within the virtual universe of a product support center for the product; and a system for providing an avatar with a teleportation invitation to the product support center.

A third aspect of the present invention is directed to a program product stored on a computer readable medium, which when executed, provides customer service in a virtual universe, the computer readable medium comprising program code for: determining that a real-world product has a problem; collecting information associated with the product; analyzing the collected information at a support location service in the virtual universe to determine a land location within the virtual universe of a product support center for the product; and providing an avatar with a teleportation invitation to the product support center.

A fourth aspect of the present invention is directed to a method for deploying an application for providing customer service in a virtual universe, comprising: providing a computer infrastructure being operable to: determine that a real-world product has a problem; collect information associated with the product; analyze the collected information at a support location service in the virtual universe to determine a land location within the virtual universe of a product support center for the product; and provide an avatar with a teleportation invitation to the product support center.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
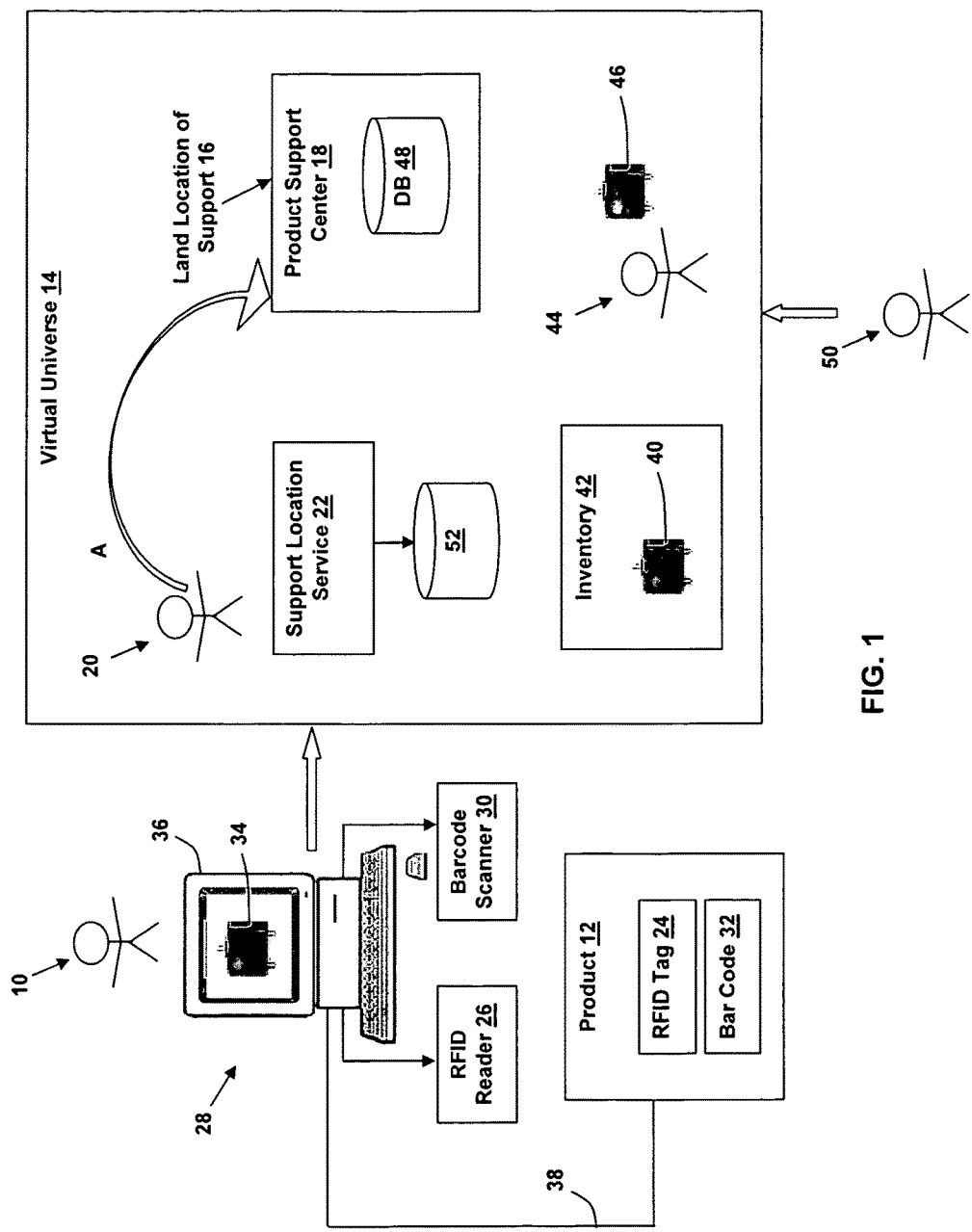
FIG. 1 depicts an illustrative system for virtual universe customer support in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention is directed to virtual universe customer support.

FIG. 1 depicts a system for providing virtual universe customer support in accordance with an embodiment of the present invention. As shown, a customer 10 has purchased or otherwise obtained a "real-world" product 12, and has a support issue regarding the product 12. Support for the product 12 is available via a virtual universe 14.

Determining Support Location

To obtain support for the product 12, the customer 10 determines a land location 16 within the virtual universe 14 where a corresponding product support center 18 is available. If the customer 10 is already aware of the land location 16, the customer 10 can navigate or teleport an avatar 20 through the virtual universe 14 to that land location 16 as indicated by arrow A in FIG. 1. If the customer 10 does not know the land location 16, the customer 10 can use an automated support location service 22 to locate the land location 16 of the product support center 18 in the virtual universe 14. This can include, for example, navigating or teleporting the customer's avatar 20 to the support location service 22.

Numerous techniques can be used to identify the product 12 to the support location service 22 to allow the support location service 22 to provide the customer 10 with the land location 16 of the product support center 18 where the customer 10 can receive product support for the product 12. For example, the customer 10 can directly input information regarding the identity of the product 12 to the support location service 22. This can include, for example, inputting information such as manufacturer, model number, serial number, and/or the like. Further, if the product 12 is equipped with, or otherwise associated with (e.g., on the product packaging), a radio frequency identification (RFID) tag 24, an RFID reader 26 (e.g., coupled to a client computer device 28 used by the customer 10 to access the virtual universe 14) can be used to read the RFID tag 24 and transfer its contents (e.g., a product ID) to the support location service 22.

In another embodiment, a bar code scanner 30 can be used to retrieve a product ID from a UPC bar code 32 located on, or associated with (e.g., on the product packaging), the product 12. Still yet, the customer 10 can directly provide the product ID (and/or other identifying information) of the product 12 (e.g., using the client computer device 28) to the support location service 22 or select the product 12 from virtual product renderings 34 of one or more products 12 displayed on a display 36 of the client computer device 28. Such virtual product renderings 34 can be provided by the client computer device 28, by the support location service 22, or in any other suitable manner. In addition to direct entry of the product ID of the product 12, the customer 10 can select the manufacture of the product 12 (e.g., from a drop down list), select a rendering of an avatar logo, etc.

In a further embodiment, the product 12 can self-report its identity to the support location service 22 via a network connection 38 (e.g., directly and/or through the client computer device 28). This self-reporting can be provided, for example, through a "service processor," i.e., an inexpensive processor with its own power source, to perform the limited function of problem reporting, or through any other suitable mechanism.

In another embodiment, the customer 10 can keep virtual renderings 40 of one or more different products 12 in their virtual universe inventory 42. Selection of the virtual rendering 40 of a product 12 in the virtual universe inventory 42 can result in the transmission of a corresponding product ID to the support location service 22. The customer 10 can enter the product 12 manually into their virtual universe inventory 42 and/or the product 12 can be populated automatically (e.g., when purchased or registered).

Once the product 12 and associated land location 16 of the product support center 18 are determined, an invitation to teleport the avatar 20 to that land location 16 can be presented to the customer 10.

Problem Reporting

Depending on the method by which the customer 10 arrives at the land location 16 of the product support center 18, the customer 10 may have to identify the product 12 to the product support center 18. If the avatar 20 of the customer 10 arrives at the product support center 18 by navigating or teleporting to that location—without an invitation from the support location service 22, the customer 10 may have to identify the product 12 for which they are seeking support. Any of the above-described methods for product identification can be used for this purpose. Additionally, if the avatar 20 has been to the product support center 16 previously (e.g., as determined using a universally unique identifier (UUID) of the avatar 20 or other suitable technique), the avatar 20 can be presented with a list of products 12 for which they have already received support.

To receive assistance from the product support center 18, the customer 10 first identifies a problem related to the product 12. Embodiments may differ, but illustrative methods of identifying problems to the product support center 16 can include, for example: use of a free-form field backed by a search engine; guided questions such as "does the product display output: yes/no"; or selection of problems from a list. Yet still, other embodiments may allow the customer 10 to instruct their avatar 20 to point to the problem area of a virtual rendering of the product 12 within the virtual universe 14. This may comprise, for example, pointing to the screen of a television when not receiving the appropriate output on the television. Once the problem has been identified, the product support center 18 can assist the customer with the problem using automated assistance and/or interactive assistance.

Automated Assistance

To assist a customer 10 with the most common problems, the product support center 18 can provide an automated avatar 44 which is configured to walk the customer 10 through one or more possible solutions, using, for example, a virtual rendering 46 of the product 12. The virtual rendering 46 can be viewed on the display 36 of the client computer device 28. For instance, if the customer 10 complains that he/she is not receiving television output from a DVD player, an automated avatar 44 can show the customer 10 how to verify that the DVD player is properly connected to the television using a virtual rendering 46 of the DVD player and television. One benefit of receiving support in the virtual universe 14 rather than over the phone or a web browser is that the customer 10 can view accurate virtual renderings 46 of a product 12 (and parts thereof) and of all steps required to correct various problems, some/all of which can be demonstrated by an automated avatar 44. Specific parts of the product 12 can be highlighted, as necessary, on the virtual rendering 46 of the product 12. The step(s) demonstrated by an automated avatar 44 for a given problem can be stored in a database (DB) 48 and/or the like that can be accessed by the product support center 18.

Interactive Assistance

If automated assistance is unable to resolve a customer's problem, or if a customer 10 wishes to deal with a real person instead, support may be escalated to an interactive session with a human support technician 50. Because interactive assistance employs a support technician 50, there may or may not be a wait until a support technician 50 is available. If a support technician 50 is not available, the customer 10 may be presented with the option of waiting for a support technician 50 or leaving the product support center 18 and performing other activities. If the customer 10 opts to leave, the product support center 18 or other entity can send the customer 10 (or the avatar 20 of the customer 10) an automated teleportation request when a support technician 50 is/becomes available. This teleportation request, which can be required if the customer 10 must wait for support and leaves the product support center 18, is referred to as a "recall teleport." If the customer 10 opts to wait, the virtual universe 14 can provide the customer 10 with an interactive experience, such as a game or a virtual challenge, to keep the customer 10 occupied while waiting for a support technician 50.

The support technician 50 can virtually interact with the customer 10 and/or product 12 via the virtual universe 14. The support technician 50 can show the customer 10 how to resolve problems by performing actions on a virtual rendering 46 of the product 12, which the customer 10 can observe on the display 36 of the client computer device 28. Specific parts of the product 12 can be highlighted, as necessary, on the virtual rendering 46 of the product 12. Depending on the embodiment, the support technician 50 can communicate with the customer 10 via instant messaging within the virtual universe 14, using a VOIP (Voice Over IP) solution within the virtual universe 14, or using any other suitable communication technique.

Figure 2:
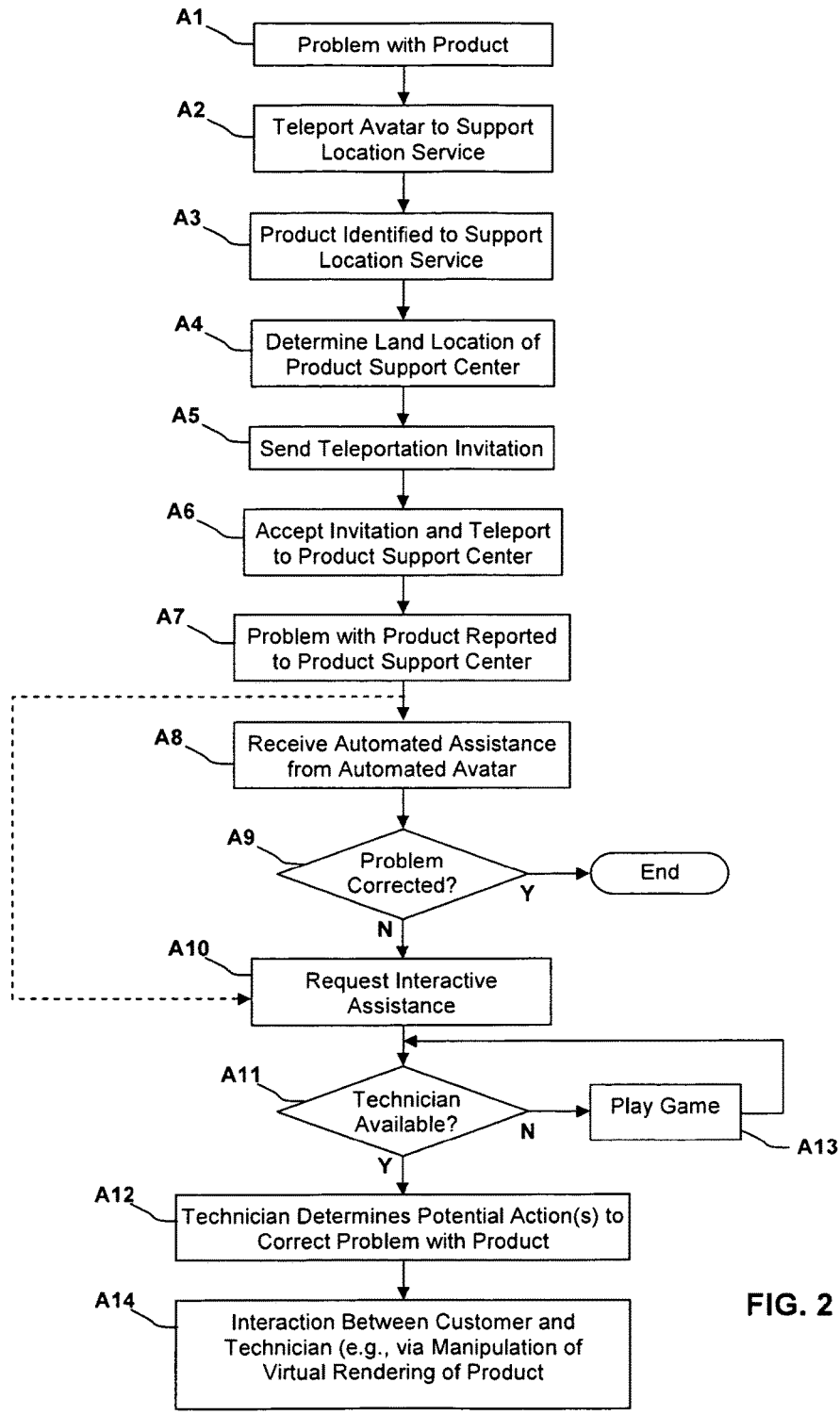
FIGS. 2-3 depict illustrative processes in accordance with embodiment(s) of the present invention.

A first example of providing a customer 10 with product support is depicted in FIG. 2.

At A1, the customer 10 determines that he/she has a problem with a product 12 (e.g., the customer is unable to watch a DVD on his/her television). At A2, the customer 10 teleports his/her avatar 20 to the support location service 22. At A3, the product 12 is identified to the support location service 22, which determines at A4 the land location in the virtual universe 14 of the product support center 18 for the product 12. At A5, the support location service 22 sends to the avatar 20 a teleportation invitation to the land location of the product support center 18. At A6, after accepting the teleportation invitation, the avatar 20 teleports to the land location of the product support center 18 for the product 12. At A7, the problem with the product 12 is reported to the product support center 18.

At A8, the customer 10 receives automated assistance from an automated avatar 44. If the problem is corrected (YES, A9), the process ends. If the customer 10, however, is unable to correct the problem based on the assistance provided by the automated avatar 44 (N0, A9), the customer 10 can request interactive assistance at A10. If a support technician 50 is available (YES, A11), flow passes to A12. If a support technician 50 is not available (NO, A11) the customer 10 may be offered a game to play at A13. When the support technician 50 becomes available (YES, A11) and the customer 10 accepts a recall teleport, then at A12, the support technician 50 reviews the interactions with the automated avatar 44, previous customer history with the product support center 18, and/or the like, and determines potential course(s) of action to correct the problem with the product 12. At A14, the customer 10 engages in communications with the support technician 50, resulting in the support technician 50 showing the customer 10 how to correct the problem by manipulating a virtual rendering 46 of the product 12.

After the problem with the product 12 has been reported to the product support center 18 at A7, the customer 10 may decide to skip assistance provided by an automated avatar 44 and immediately request interactive assistance (A10) from a support technician 50. This flow is depicted by the dashed line in FIG. 2.

Figure 3:
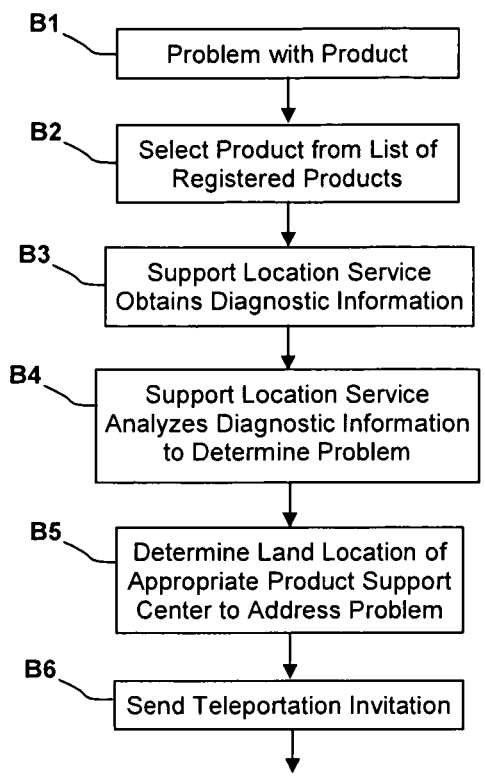

An additional example of providing a customer 10 with product support is depicted in FIG. 3.

At B1, a customer 10 believes that he/she may have a problem with a product 12 (e.g., the customer 10 believes his/her computer's hard drive is making noise). At B2, the customer selects the product 12 from a list of registered real-world devices (e.g., the customer has registered his/her computer, which enables the support location service 22 to obtain diagnostic information from a file on the computer). At B3, the support location service 22 acquires the diagnostic information from the computer (e.g., via a network connection). At B4, the support location service 22 analyzes the diagnostic information (e.g. hard-drive error information, hard-drive manufacturer, computer owner's ID, dates, etc) to determine the problem, which can be graphically depicted (optionally) to the customer 10.

At B5, the support location service 22 uses the analysis from B4 to determine the land location in the virtual universe 14 of a product support center 18 for the product 12 that offers the appropriate repair, help, or information for addressing the problem determined at B4 (e.g. determines that the best place for help is not the computer manufacturer but rather the hard-drive manufacturer). This determination can be based, for example, on policy and/or information tables 52 supplied by the various product/component manufacturers (e.g., by the computer manufacturer or hard-drive manufacturer). The determination can also be based on which manufacturers or service providers actually have a presence in the virtual universe 14. At B6, the support location service 22 sends to the avatar 20 a teleportation invitation to the land location of the product support center 18. Flow can then proceed, for example, in a manner similar to that described above with regard to A6-A14 in FIG. 2.

In another embodiment of the present invention, a virtual rendering 40 of a product 12 with a problem can be automatically placed in the virtual universe inventory 42. This allows the customer 10 to have a record of the problem and also allows the customer 10 to remove the product 12 from the virtual universe inventory 42 to show to a support technician 50 (or others), if desired/required. Information regarding the product 12 and/or its components can also be provided in the virtual universe inventory 42.

Figure 4:
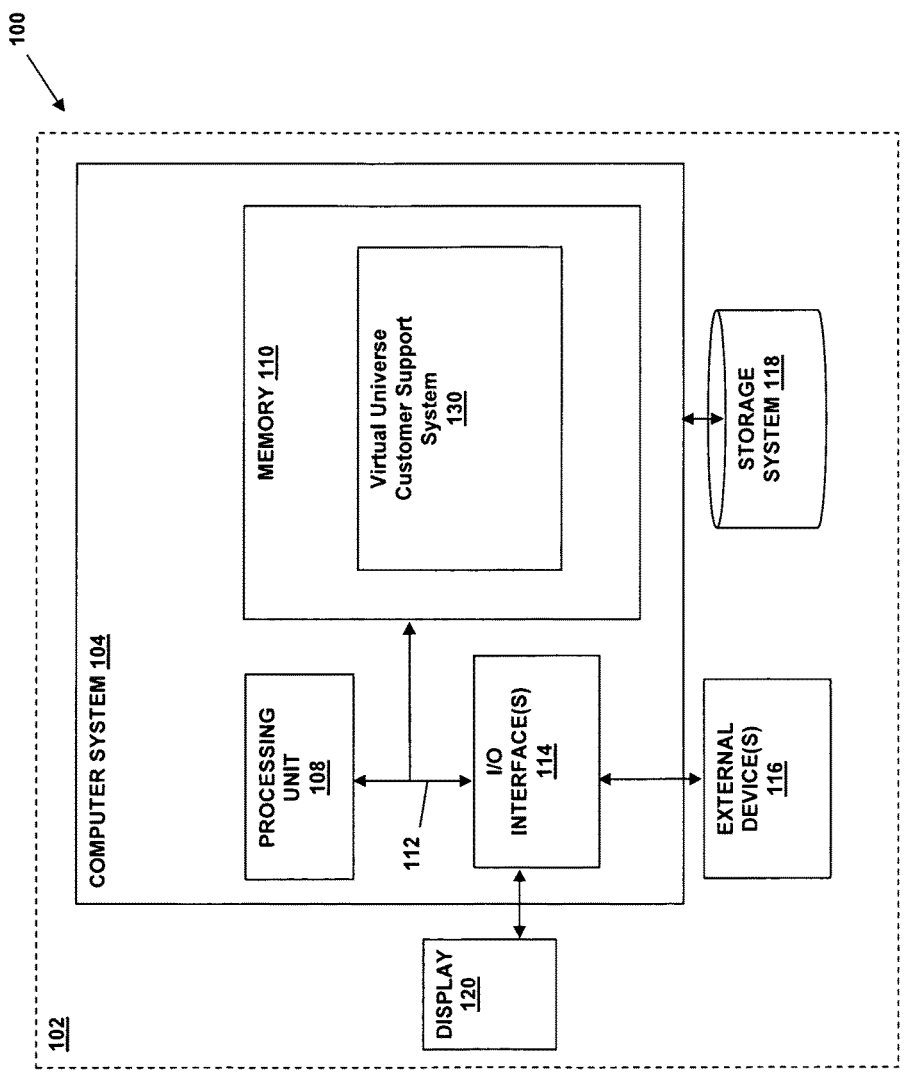
FIG. 4 depicts an illustrative computer system for implementing embodiment(s) of the present invention.

FIG. 4 depicts an illustrative system 100 for providing virtual universe customer support in accordance with any/all embodiments of the present invention. The system 100 includes a computer infrastructure 102 that can perform the various processes described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as virtual universe customer support system 130, that is stored in memory 110 and/or storage system 118, and which is configured to implement any/all processes provided by the present invention. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user to interact with the computer system 104 or any device that enables the computer system 104 to communicate with one or more other computer systems.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in an embodiment, the computer infrastructure 102 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 4 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.).

In another embodiment, the invention provides a business method that performs the processes of the invention on a subscription, advertising, and/or fee basis. A service provider can create, maintain, support, etc., a computer infrastructure, such as the computer infrastructure 102, that performs the processes of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the embodiments of this invention has been presented for purposes of illustration and description. It is not intended to be exhaustive or to limit the invention to the precise form disclosed, and obviously, many modifications and variations are possible.

What is claimed is:

1. A method for providing customer service in a virtual universe using at least one computing device, comprising:
   analyzing information associated with a real-world product with a problem at a support location service in the virtual universe to determine a land location within the virtual universe of a product support center for the product,
   wherein the product support center is controlled by a common commercial entity related to the support location service, the common commercial entity providing at least one of: the real-world product or a related service for the real-world product to a user of the real-world product;
   providing an avatar, controlled by the user, with a teleportation invitation to the product support center, using the at least one computing device;
   providing an automated avatar at the product support center in response to the avatar accepting the teleportation invitation, using the at least one computing device; and
   using the automated avatar to demonstrate at least one possible solution for the problem,
   wherein the automated avatar demonstrates the at least one solution using a graphic virtual rendering of the product and a graphic virtual rendering of the solution in the virtual universe.

2. The method of claim 1, further comprising:
   teleporting the avatar to the support location service.

3. The method of claim 1, further comprising:
   providing automated assistance for the problem at the product support center.

4. The method of claim 1, further comprising:
   providing interactive assistance for the problem with a human support technician at the product support center,
   wherein the providing of the interactive assistance with the human support technician is performed in response to the at least one possible solution presented by the automated avatar failing to resolve the problem,
wherein the support technician interacts via the virtual universe to demonstrate at least one possible solution for the problem.

5. The method of claim 4, wherein the support technician demonstrates the at least one solution using the virtual rendering of the product.

6. The method of claim 4, wherein the providing of the interactive assistance for the problem with a human support technician at the product support center further comprises:
  determining if a support technician is available;
  in the case that a support technician is not available, allowing the avatar to exit the product support center and sending the avatar a recall teleport invitation when a support technician becomes available.

7. The method of claim 1, further comprising collecting information associated with the product, wherein the collecting comprises at least one of:
  manually inputting the information to the support location service;
  reading a radio frequency identification (RFID) tag;
  reading a bar code;
  self-reporting by the product via a network; or
  selecting a virtual rendering of the product from a virtual universe inventory.

8. A computer system comprising:
  at least one computing device configured to provide customer service in a virtual universe by performing actions comprising:
    analyzing information associated with a real-world product with a problem at a support location service in the virtual universe to determine a land location within the virtual universe of a product support center for the product,
    wherein the product support center is controlled by a common commercial entity related to the support location service, the common commercial entity providing at least one of: the real-world product or a related service for the real-world product to a user of the real-world product;
    providing an avatar, controlled by the user, with a teleportation invitation to the product support center;
    providing an automated avatar at the product support center in response to the avatar accepting the teleportation invitation; and
    using the automated avatar to demonstrate at least one possible solution for the problem,
    wherein the automated avatar demonstrates the at least one solution using a graphic virtual rendering of the product and a graphic virtual rendering of the solution in the virtual universe.

9. The system of claim 8, wherein the at least one computing device is further configured to perform actions comprising:
  teleporting the avatar to the support location service.

10. The system of claim 8, wherein the at least one computing device is further configured to perform actions comprising:
  providing automated assistance for the problem at the product support center.

11. The system of claim 8, wherein the at least one computing device is further configured to perform actions comprising:
  providing interactive assistance for the problem with a human support technician at the product support center,
  wherein the providing of the interactive assistance with the human support technician is performed in response to the at least one possible solution presented by the automated avatar failing to resolve the problem,
  wherein the support technician interacts via the virtual universe to demonstrate at least one possible solution for the problem.

12. The system of claim 11, wherein the support technician demonstrates the at least one solution using the virtual rendering of the product.

13. The system of claim 11, wherein the providing of the interactive assistance for the problem with a human support technician at the product support center further comprises:
  determining if a support technician is available; and
  in the case that a support technician is not available, allowing the avatar to exit the product support center and sending the avatar a recall teleport invitation when a support technician becomes available.

14. The system of claim 8, further comprising collecting the information associated with the product, wherein the collecting comprises at least one of:
  manually inputting the information to the support location service;
  reading a radio frequency identification (RFID) tag;
  reading a bar code;
  self-reporting by the product via a network; or
  selecting a virtual rendering of the product from a virtual universe inventory.

15. A computer program product stored on a non-transitory computer readable medium, which when executed, provides customer service in a virtual universe, the computer readable medium comprising program code for:
  analyzing information associated with a real-world product with a problem at a support location service in the virtual universe to determine a land location within the virtual universe of a product support center for the product,
  wherein the product support center is controlled by a common commercial entity related to the support location service, the common commercial entity providing at least one of: the real-world product or a related service for the real-world product to a user of the real-world product;
  providing an avatar, controlled by the user, with a teleportation invitation to the product support center;
  providing an automated avatar at the product support center in response to the avatar accepting the teleportation invitation, using the at least one computing device; and
  using the automated avatar to demonstrate at least one possible solution for the problem,
  wherein the automated avatar demonstrates the at least one solution using a graphic virtual rendering of the product and a graphic virtual rendering of the solution in the virtual universe.

16. A method for providing customer service in a virtual universe using at least one computing device, comprising:
  analyzing information associated with a real-world product with a problem at a support location service in the virtual universe to determine a land location within the virtual universe of a product support center for the product,
  wherein the product support center is controlled by a common commercial entity related to the support location service, the common commercial entity providing at least one of: the real-world product or a related service for the real-world product to a user of the real-world product;

providing an avatar, controlled by the user, with a teleportation invitation to the product support center;

providing an automated avatar at the product support center in response to the avatar accepting the teleportation invitation, using the at least one computing device;

using the automated avatar to demonstrate at least one possible solution for the problem, wherein the automated avatar demonstrates the at least one solution using a graphic virtual rendering of the product and a graphic virtual rendering of the solution in the virtual universe;

providing interactive assistance for the problem with a human support technician at the product support center in response to the at least one possible solution presented by the automated avatar failing to resolve the problem with the real-world product, wherein the support technician interacts via the virtual universe to demonstrate at least one possible solution for the problem.

* * * * *